United States Patent
Yamauchi

(10) Patent No.: US 10,006,535 B2
(45) Date of Patent: Jun. 26, 2018

(54) DRIVING FORCE TRANSMISSION SYSTEM FOR ENGINE

(71) Applicant: MAZDA MOTOR CORPORATION, Hiroshima (JP)

(72) Inventor: Michihiro Yamauchi, Hatsukaichi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 113 days.

(21) Appl. No.: 15/219,468

(22) Filed: Jul. 26, 2016

(65) Prior Publication Data
US 2017/0030452 A1   Feb. 2, 2017

(30) Foreign Application Priority Data

Jul. 29, 2015   (JP) ................................. 2015-149750

(51) Int. Cl.
*F16H 7/00*   (2006.01)
*F16D 3/00*   (2006.01)
(Continued)

(52) U.S. Cl.
CPC .............. *F16H 55/30* (2013.01); *F01L 1/022* (2013.01); *F01L 1/344* (2013.01); *F02M 39/02* (2013.01);
(Continued)

(58) Field of Classification Search
CPC ... F01L 1/02; F01L 1/022; F01L 1/024; F16H 2055/306; F16H 55/30
(Continued)

(56) References Cited

U.S. PATENT DOCUMENTS 1,254,542 A * 1/1918 Schwinn .................... F16D 3/66
                                                              222/360
2,303,093 A * 11/1942 Schreck ................... F02B 67/04
                                                              123/195 A
(Continued)

FOREIGN PATENT DOCUMENTS

CN   101400878      4/2009
CN   201416465 Y   3/2010
(Continued)

OTHER PUBLICATIONS

An Office Action issued by Chinese Patent Office dated Apr. 18, 2018, which corresponds to Chinese Patent Application No. 201610588986.8 and is related to U.S. Appl. No. 15/219,468; English Summary.

*Primary Examiner* — Henry Y Liu
(74) *Attorney, Agent, or Firm* — Studebaker & Brackett PC

(57) ABSTRACT

A driving force transmission system for an engine is provided with a crank sprocket mounted on a crankshaft, cam sprockets mounted on camshafts, an intermediate shaft disposed between the crankshaft and the camshafts, a dual sprocket mounted on the intermediate shaft, and including a first sprocket and a second sprocket facing each other in a state that the first and second sprockets are rotatable relative to each other, a first endless transmission member wound around the crank sprocket and the first sprocket, and a second endless transmission member wound around the cam sprocket and the second sprocket. The dual sprocket includes a damping portion for connecting the first and second sprockets. The damping portion is configured to exert a resilient force in a rotational direction of the first and second sprockets.

6 Claims, 9 Drawing Sheets

(51) Int. Cl.
| | |
|---|---|
| *F16H 55/14* | (2006.01) |
| *F16H 55/36* | (2006.01) |
| *F16H 55/30* | (2006.01) |
| *F16H 7/06* | (2006.01) |
| *F01L 1/02* | (2006.01) |
| *F02M 39/02* | (2006.01) |
| *F01L 1/344* | (2006.01) |

(52) U.S. Cl.
CPC ............... *F16H 7/06* (2013.01); *F16H 55/14* (2013.01); *F16H 2055/306* (2013.01)

(58) Field of Classification Search
USPC ........................................................ 474/94, 86
See application file for complete search history.

(56) References Cited

U.S. PATENT DOCUMENTS

| | | | | | |
|---|---|---|---|---|---|
| 3,524,359 | A | * | 8/1970 | Buchwald | F01L 1/024 474/110 |
| 4,177,773 | A | * | 12/1979 | Cribbs | F01L 1/34409 123/90.15 |
| 4,556,026 | A | * | 12/1985 | Masuda | F01L 13/00 123/192.2 |
| 4,776,307 | A | * | 10/1988 | Ruf | F01L 1/02 123/90.31 |
| 5,579,665 | A | * | 12/1996 | Mott | F01L 1/02 123/90.31 |
| 5,609,127 | A | * | 3/1997 | Noplis | F01L 1/344 123/90.17 |
| 5,619,887 | A | * | 4/1997 | Simpson | F01L 1/16 123/90.31 |
| 5,690,568 | A | * | 11/1997 | Watson | B22F 7/062 474/152 |
| 5,873,336 | A | * | 2/1999 | Uchida | F01L 1/02 123/193.5 |
| 6,109,227 | A | * | 8/2000 | Mott | F16H 7/06 123/192.2 |
| 6,161,512 | A | * | 12/2000 | Beels Van Heemstede | F16F 15/1232 123/192.1 |
| 6,234,127 | B1 | * | 5/2001 | Simpson | F16F 15/1204 123/192.2 |
| 6,283,076 | B1 | * | 9/2001 | Simpson | F16H 7/06 123/192.1 |
| 6,289,860 | B1 | * | 9/2001 | Speckhart | F01L 1/02 123/90.15 |
| 6,308,673 | B1 | * | 10/2001 | Kobayashi | F01L 1/02 123/195 C |
| 6,652,400 | B2 | * | 11/2003 | Duesmann | F01L 1/02 474/148 |
| 6,959,682 | B2 | * | 11/2005 | Slopsema | F02B 75/06 123/192.1 |
| 7,273,028 | B1 | * | 9/2007 | Ho | F01L 1/024 123/192.2 |
| 8,677,849 | B2 | * | 3/2014 | Simpson | F16F 15/1421 123/90.31 |
| 2002/0035983 | A1 | * | 3/2002 | Kobayashi | F01L 1/02 123/196 M |
| 2002/0189562 | A1 | * | 12/2002 | Iizuka | F01L 1/34 123/90.17 |
| 2003/0226532 | A1 | * | 12/2003 | Takenaka | F01L 1/352 123/90.17 |
| 2007/0056544 | A1 | * | 3/2007 | Purcilly | F01L 1/02 123/90.31 |
| 2010/0224149 | A1 | | 9/2010 | Hirschmann et al. | |
| 2011/0041786 | A1 | * | 2/2011 | Goto | F02D 13/0219 123/90.15 |
| 2011/0132116 | A1 | * | 6/2011 | Simpson | F16F 15/1421 74/411 |

FOREIGN PATENT DOCUMENTS

| | | |
|---|---|---|
| CN | 103790664 A | 5/2014 |
| JP | H03-081509 A | 4/1991 |
| JP | 2004-084953 A | 3/2004 |
| JP | 2007-085236 A | 4/2007 |

\* cited by examiner

ROTATIONAL DIRECTION

DRIVING FORCE TRANSMISSION SYSTEM FOR ENGINE

BACKGROUND OF THE INVENTION

1. Field of the Invention

The present invention relates to a driving force transmission system for an engine.

2. Background Art

Conventionally, an intake camshaft and an exhaust camshaft of an engine are connected to a crankshaft via a power transmission mechanism constituted by a timing chain, sprockets, and the like. The timing chain receives an excitation force by reciprocal motion of an intake valve, an exhaust valve, and the like.

When a vibrational frequency of an excitation force approaches a natural frequency (resonant frequency) of a power transmission mechanism, a timing chain is brought to a resonant state, and an excessive tension force is generated in the timing chain. As a result, the life of the timing chain may be shortened.

In order to eliminate the aforementioned drawback, for instance, Japanese Unexamined Patent Publication No. 2011-43092 discloses the following configuration. Specifically, in the aforementioned publication, a plunger of a fuel pump connected to an exhaust camshaft is caused to reciprocally move with a phase opposite to the phase of an exhaust valve in reciprocal motion. According to the aforementioned configuration, an excitation force by the exhaust valve is offset by an excitation force by the fuel pump.

In recent years, development on an engine having a high compression ratio has progressed as one of the measures for improving fuel economy of the engine. In such an engine, it is necessary to finely control a valve timing. In view of the above, an intake cam and an exhaust cam are controlled to open and close at an optimum timing by a variable valve timing mechanism (VVT). A camshaft, and a sprocket for transmitting a rotational force of a crankshaft to the camshaft are connected to each other via the VVT. Further, a high-pressure fuel pump may be used to finely control fuel injection into a combustion chamber.

In a general engine, a fuel pump is configured such that a fuel pump drive shaft is connected to an end of a camshaft, and the fuel pump is driven by a rotational force of a crankshaft together with the camshaft via a timing chain or a timing belt. In order to drive a high-pressure fuel pump, a large driving force is necessary. Therefore, when a large driving force is transmitted to a camshaft via a VVT, particularly, when a VVT is an electric VVT configured to be driven by a motor, a torque necessary for driving a high-pressure fuel pump may exceed a torque to be generated by the motor of the electric VVT. As a result, the VVT may not be operated. In view of the above, it is not appropriate to connect a high-pressure fuel pump to a camshaft when a VVT is mounted on the camshaft. As well as the aforementioned configuration, when a VVT is hydraulically operated, a high hydraulic pressure is necessary so that the VVT is operated with a torque larger than a driving torque of a fuel pump. This may lead to an increase in load of an oil pump, and an increase in mechanical resistance.

In view of the above, the inventor conceived an idea of operating a high-pressure fuel pump by disposing a drive shaft (pump drive shaft) of the high-pressure fuel pump between a crankshaft and a camshaft in the height direction of an engine, mounting two sprockets on the pump drive shaft, winding a first timing chain around one of the sprockets and a sprocket of the crankshaft, and winding a second timing chain around the other of the sprockets, an intake camshaft, and an exhaust camshaft.

However, the aforementioned configuration is not a configuration as disclosed in the aforementioned publication, in which a fuel pump is connected to an exhaust camshaft. Therefore, it may be impossible to offset an excitation force by reciprocal motion of an exhaust valve by an excitation force by a fuel pump. As a result, it may be impossible to suppress an excitation force acting on a timing chain. This may cause a phenomenon that the timing chain is brought to a resonant state.

SUMMARY OF THE INVENTION

In view of the above, an object of the present invention is to provide a driving force transmission system for an engine, which enables to extend the life of a timing chain by effectively suppressing a phenomenon that the timing chain is brought to a resonant state.

In order to solve the aforementioned problem, the present invention provides a driving force transmission system for an engine, configured to transmit a driving force of a crankshaft constituting the engine to a camshaft by an endless transmission member. The driving force transmission system is provided with a crank sprocket mounted on the crankshaft; a cam sprocket mounted on the camshaft; an intermediate shaft disposed between the crankshaft and the camshaft; a dual sprocket mounted on the intermediate shaft, and including a first sprocket and a second sprocket facing each other in a state that the first sprocket and the second sprocket are rotatable relative to each other; a first endless transmission member wound around the crank sprocket and the first sprocket; and a second endless transmission member wound around the cam sprocket and the second sprocket. The dual sprocket includes a damping portion for connecting the first sprocket and the second sprocket, the damping portion being configured to exert a resilient force in a rotational direction of each of the first sprocket and the second sprocket.

According to the present invention, it is possible to extend the life of an endless transmission member by effectively suppressing a phenomenon that the endless transmission member is brought to a resonant state.

These and other objects, features and advantages of the present invention will become more apparent upon reading the following detailed description along with the accompanying drawings.

DETAILED DESCRIPTION OF THE PREFERRED EMBODIMENTS OF THE INVENTION

Figure 1:
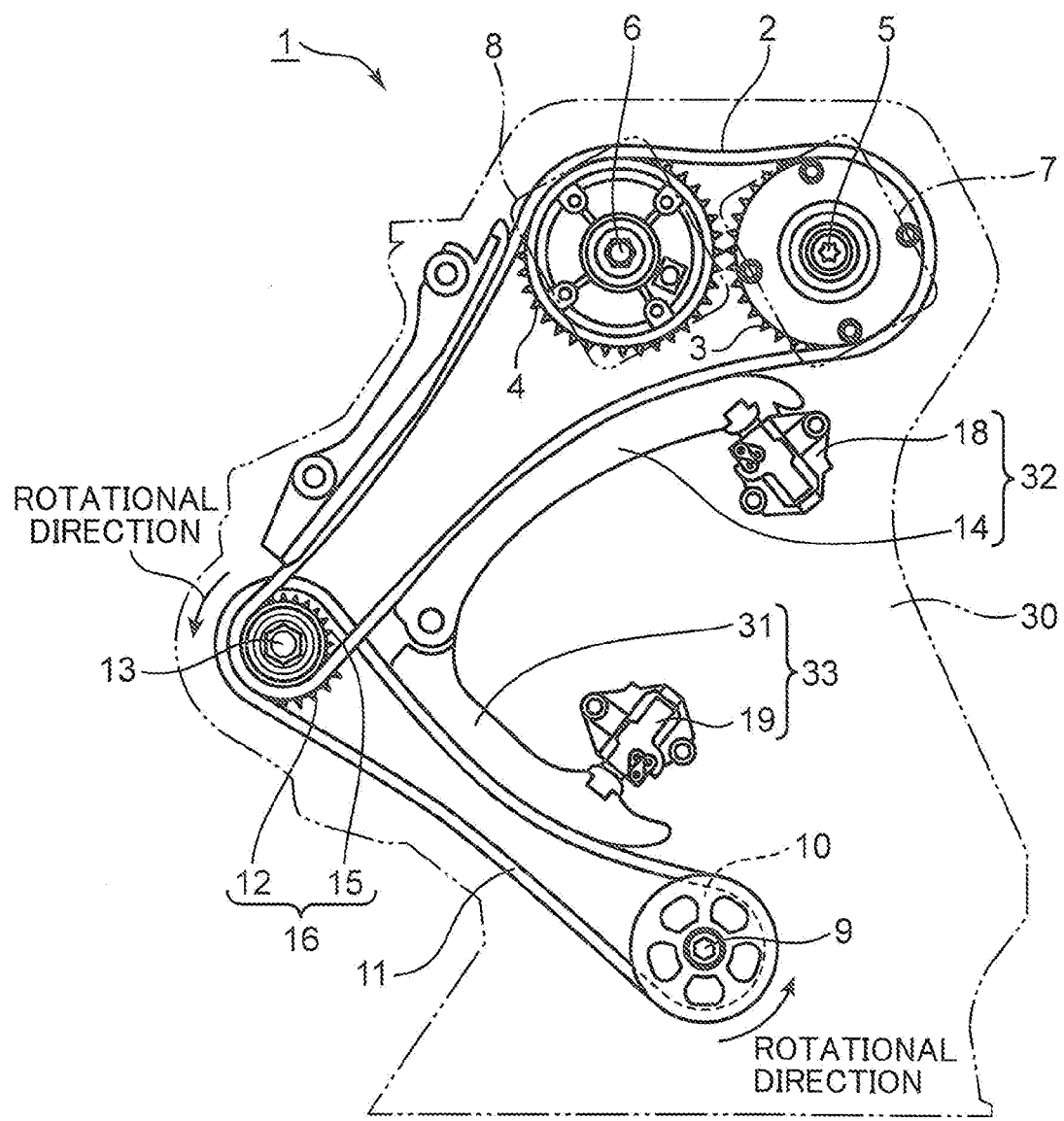
FIG. 1 is a schematic diagram illustrating a driving force transmission system for an engine in an embodiment of the present invention.
Figure 2:
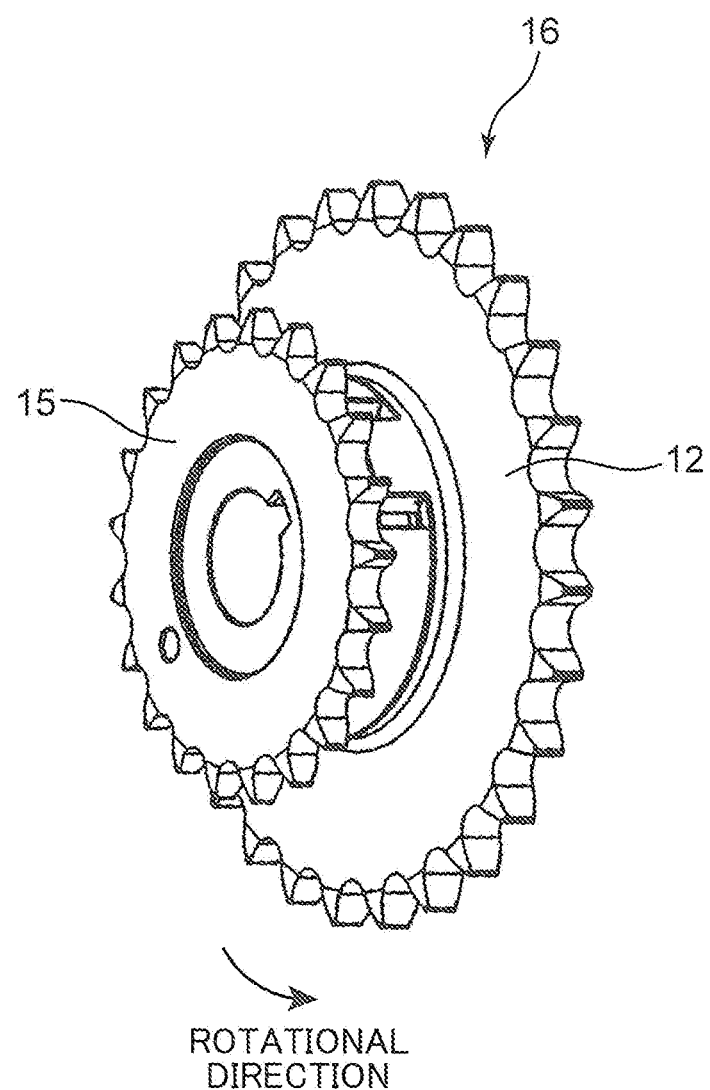
FIG. 2 is a perspective view illustrating a dual sprocket in the embodiment of the present invention.

In the following, a preferred embodiment of the present invention is described referring to the drawings.

As illustrated in FIG. 1, a driving force transmission system 1 for an engine in an embodiment of the present invention is a system for transmitting a driving force of a crankshaft 9 constituting an engine 30 to an exhaust camshaft 5 and to an intake camshaft 6 by timing chains 11 and 2.

The driving force transmission system 1 is provided with the crankshaft 9, a crank sprocket 10, the exhaust camshaft 5, an exhaust cam sprocket 3, the intake camshaft 6, an intake cam sprocket 4, an intermediate shaft 13, a dual sprocket 16, the first timing chain 11, the second timing chain 2, a variable valve timing mechanism 7 on an exhaust side (hereinafter, referred to as the "exhaust-side VVT 7"), a variable valve timing mechanism 8 on an intake side (hereinafter, referred to as the "intake-side VVT 8"), and tensioner devices 32 and 33.

The tensioner device 33 includes a tension arm 31 in contact with the first timing chain 11, and a tensioner body 19, which is an actuator for pressing the tension arm 31 toward the first timing chain 11.

The tensioner device 32 includes a tension arm 14 in contact with the second timing chain 2, and a tensioner body 18, which is an actuator for pressing the tension arm 14 toward the second timing chain 2.

The exhaust-side VVT 7 is an electric VVT mounted on the exhaust camshaft 5. The exhaust-side VVT 7 changes an opening/closing timing of an exhaust valve by sequentially changing the rotational phase of the exhaust camshaft 5 with respect to the crankshaft 9 in a predetermined angle range. The exhaust camshaft 5 and the exhaust cam sprocket 3 are connected to each other via the exhaust-side VVT 7.

The intake-side VVT 8 is an electric VVT mounted on the intake camshaft 6. The intake-side VVT 8 changes an opening/closing timing of an intake valve by sequentially changing the rotational phase of the intake camshaft 6 with respect to the crankshaft 9 in a predetermined angle range. The intake camshaft 6 and the intake cam sprocket 4 are connected to each other via the intake-side VVT 8.

The crankshaft 9 is a rotational shaft for converting a driving force by reciprocal motion of a piston (not illustrated) into a rotational force. The crank sprocket 10 is mounted on the crankshaft 9. In the example illustrated in FIG. 1, the crankshaft 9 is rotated in a counterclockwise direction.

The intermediate shaft 13 is a rotational shaft disposed between the crankshaft 9 and the exhaust camshaft 5 (the intake camshaft 6) in the height direction of the engine 30. A rotational force of the crankshaft 9 is transmitted to the intermediate shaft 13 via the first timing chain 11. The intermediate shaft 13 is a rotational shaft also serving as a fuel pump drive shaft for driving a fuel pump (not illustrated). The fuel pump increases the pressure of fuel by a reciprocally movable plunger to supply the pressurized fuel to an injector. The plunger is driven by rotation of the intermediate shaft 13 to feed the pressurized fuel. Further, in the embodiment, an intermediate shaft bearing portion (not illustrated) for supporting the intermediate shaft 13 is integrally formed with a cylinder block. Thus, the supporting rigidity of the intermediate shaft bearing portion is increased.

As illustrated in FIG. 2 to FIG. 7, the dual sprocket 16 includes a first sprocket 12 and a second sprocket 15 facing each other in a state that the first sprocket 12 and the second sprocket 15 are rotatable relative to each other. The dual sprocket 16 further includes a damping portion 17 for connecting the first sprocket 12 and the second sprocket 16. The damping portion 17 is constituted by springs 17a and 17b, each of which exerts an elastic force in a rotational direction of the first sprocket 12 and the second sprocket 15.

Figure 3:
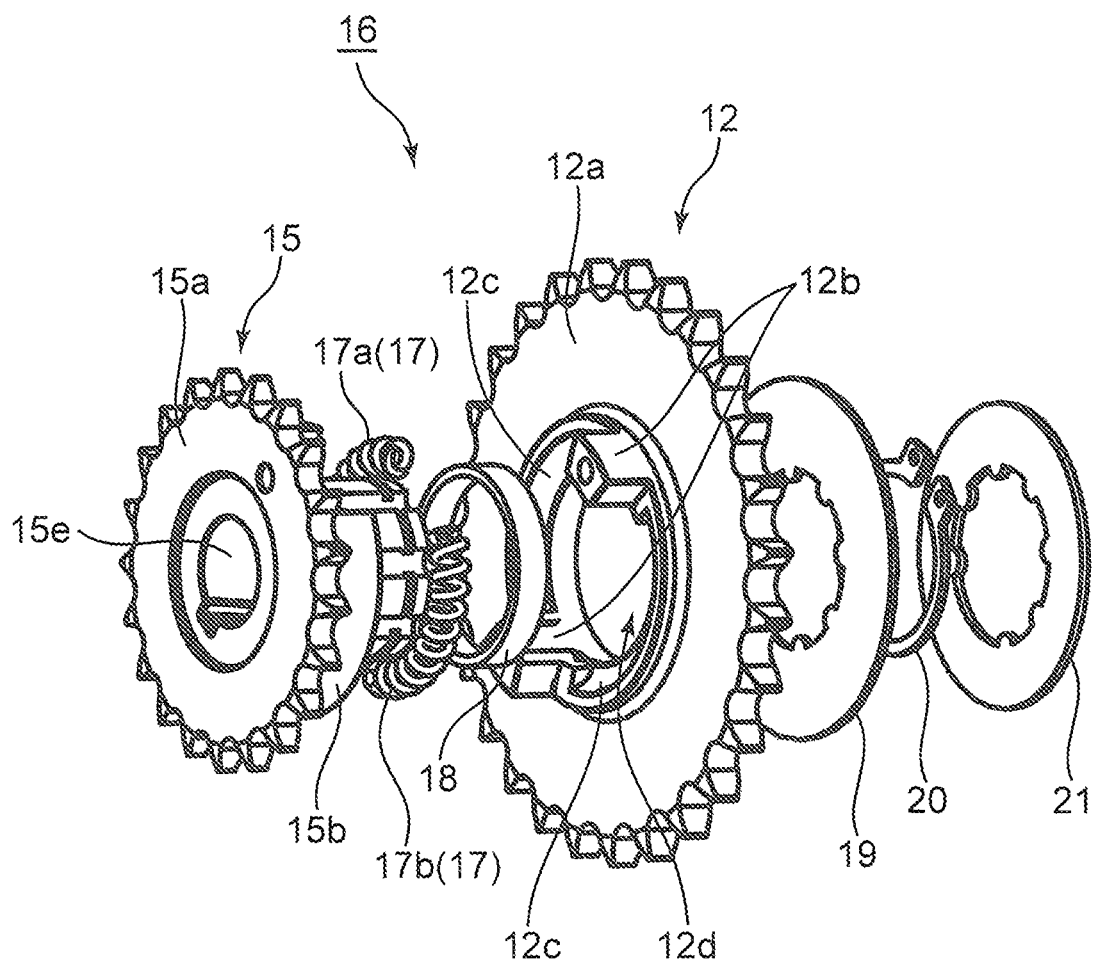
FIG. 3 is an exploded perspective view of the dual sprocket illustrated in FIG. 2.

More specifically, as illustrated in FIG. 3, the dual sprocket 16 is provided with the first sprocket 12, the second sprocket 15, the springs 17a and 17b, a bearing 18, a friction spring 19, a ring member 20, and an annular plate member 21.

The first sprocket 12 includes a ring-shaped sprocket body 12a, and two projecting portions 12b. A through-hole 12d is formed in the middle of the sprocket body 12a. The bearing 18 in a ring shape is received in the through-hole 12d. The intermediate shaft 13 passes through the bearing 18. The bearing 18 is interposed between the first sprocket 12 and the intermediate shaft 13. According to this configuration, the first sprocket 12 is pivotally movable around an axis of the intermediate shaft 13.

As illustrated in FIG. 3, the two projecting portions 12b project toward the second sprocket 15 from two positions at a periphery of an end of the through-hole 12d on the side close to the second sprocket 15 to face each other radially of the first sprocket 12.

Figure 6:
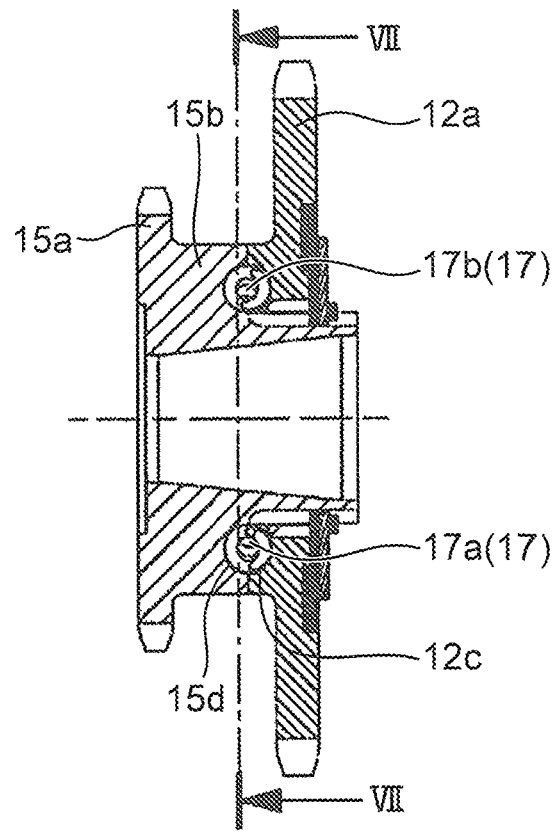
FIG. 6 is a sectional view of the dual sprocket taken along the line VI-VI in FIG. 5.

Further, as illustrated in FIG. 3 and FIG. 6, two groove portions 12c are formed in the periphery of the end of the through-hole 12d on the side close to the second sprocket 15. As illustrated in FIG. 3, the two groove portions 12c are formed at positions of the first sprocket 12 to face each other radially of the first sprocket 12 via the two projecting portions 12b. Each of the groove portions 12c is fixated into an arc shape when viewed from the side of the second sprocket 15 (see FIG. 3), and is formed into an arc shape in section (see FIG. 6). The spring 17a is disposed in one of the two groove portions 12c, and the spring 17b is disposed in the other of the two groove portions 12c (see FIG. 6).

As illustrated in FIG. 1, the first timing chain 11 is wound around the first sprocket 12 and the crank sprocket 10.

The second sprocket 15 includes a ring-shaped sprocket body 15a whose outer diameter is smaller than the outer diameter of the first sprocket 12, and a columnar-shaped spring holding portion 15b.

Figure 4:
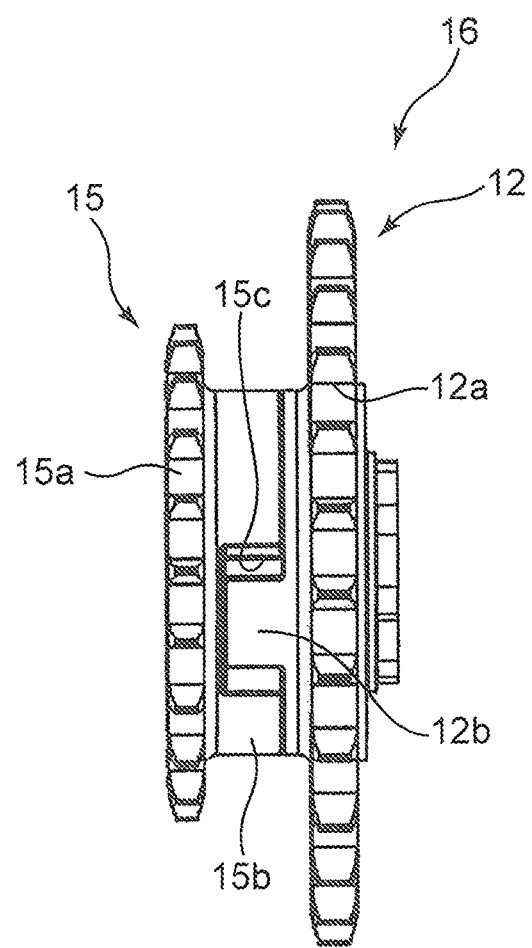
FIG. 4 is a side view illustrating the dual sprocket illustrated in FIG. 2.
Figure 5:
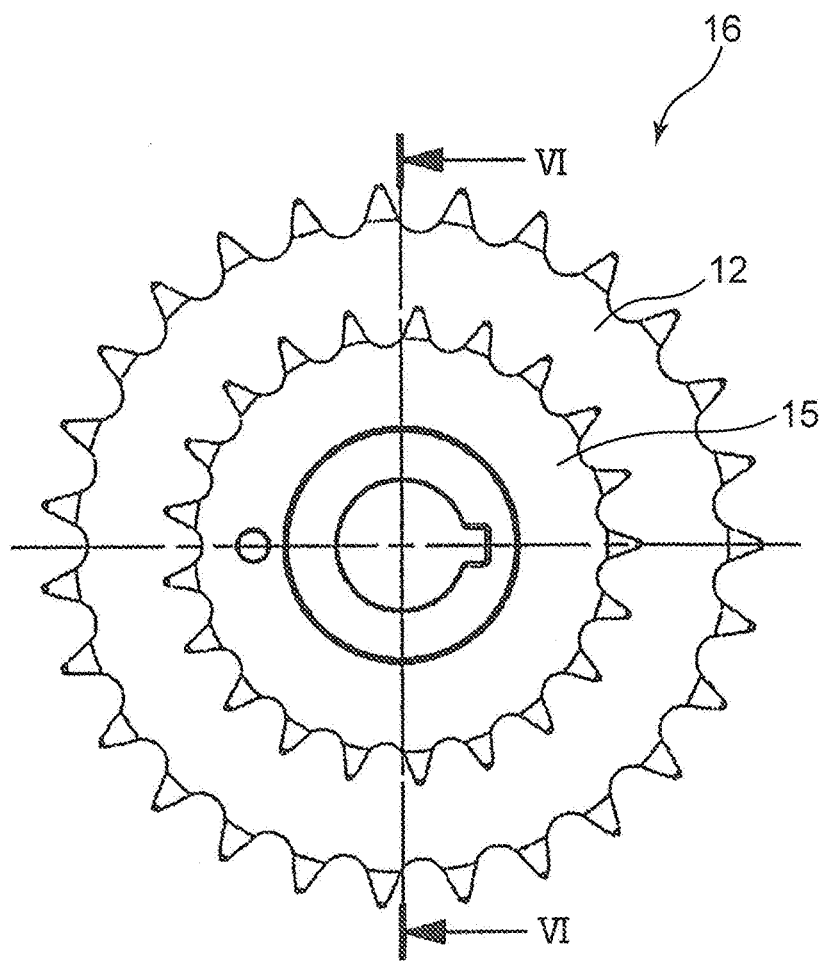
FIG. 5 is a front view illustrating the dual sprocket illustrated in FIG. 2.
Figure 7:
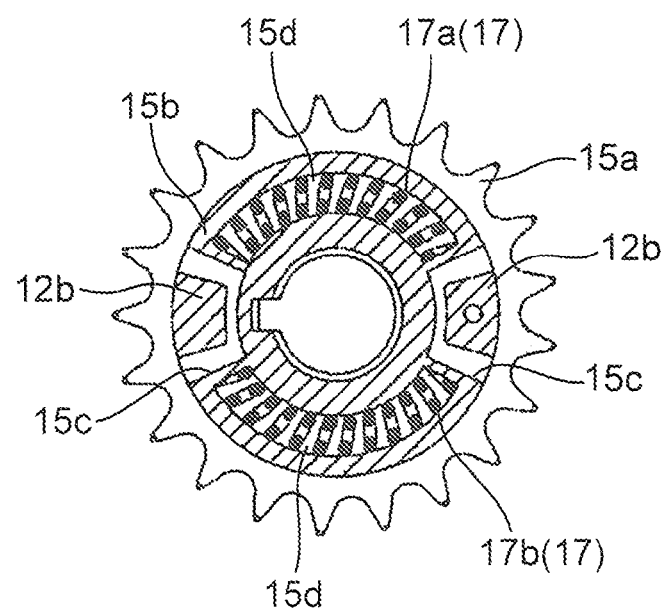
FIG. 7 is a sectional view of the dual sprocket taken along the line VII-VII in FIG. 6.

The spring holding portion 15b includes two concave portions 15c, which are concaved from the outer periphery of the spring holding portion 15b toward the inner periphery of the spring holding portion 15b. The two concave portions 15c are formed at positions of the spring holding portion 15b to face each other radially of the spring holding portion 15b. As illustrated in FIG. 4 and FIG. 7, the length of each of the concave portions 15c in the circumferential direction of the second sprocket 15 is set longer than the length of the projecting portion 12b in the circumferential direction of the first sprocket 12. Further, the radial length of each of the concave portions 15c is set longer than the radial length of the projecting portion 12b. According to this configuration, the first sprocket 12 is pivotally movable with respect to the second sprocket 15 circumferentially in a predetermined angle range in a state that the projecting portions 12b of the first sprocket 12 are received in the concave portions 15c of the second sprocket 15.

When the first sprocket 12 is rotated relative to the second sprocket 15 in a state that the projecting portions 12b of the first sprocket 12 are received in the concave portions 15c of the second sprocket 15, an elastic force (reaction force) of the springs 17a and 17b is acted in such a direction as to suppress the rotation of the first sprocket 12 relative to the second sprocket 15.

As illustrated in FIG. 6 and FIG. 7, two groove portions 15d are formed in a surface of the second sprocket 15 on the side close to the first sprocket 12. As illustrated in FIG. 7, the two groove portions 15d are formed at positions of the second sprocket 15 to face each other radially of the second sprocket 15 via the two concave portions 15c. Each of the groove portions 15d is formed into an arc shape when viewed from the side of the first sprocket 12 (see FIG. 7), and is formed into an arc shape in section (see FIG. 6). One of the two groove portions 15d faces one of the groove portions 12c of the first sprocket 12, and the other of the two groove portions 15d faces the other of the groove portions 12c of the first sprocket 12. Further, the spring 17a is disposed in one of the groove portions 15d, and the spring 17b is disposed in the other of the groove portions 15d (see FIG. 6 and FIG. 7).

As illustrated in FIG. 1, the second timing chain 2 is wound around the second sprocket 15, the exhaust cam sprocket 3, and the intake cam sprocket 4.

The spring 17a (17b) is a compression coil spring. The spring 17a is curved into an arc shape along the groove portion 12c and along the groove portion 15d in a state that the spring 17a is disposed in the groove portion 12c and in the groove portion 15d. Further, one end of the spring 17a (an end close to the counterclockwise side of the first sprocket 12) is abutted against an inner wall surface of a circumferential end of the groove portion 12c and of the groove portion 15d. The other end of the spring 17a (an end close to the clockwise side of the first sprocket 12) is abutted against an inner wall surface of the other circumferential end of the groove portion 12c and of the groove portion 15d. The spring 17b is disposed in the groove portion 12c and in the groove portion 15d in the same manner as the spring 17a.

For instance, when the first sprocket 12 is pivotally moved with respect to the second sprocket 15 (when there is a difference between a rotational speed of the first sprocket 12 and a rotational speed of the second sprocket 15) due to a fluctuation of angular velocity of the crankshaft 9, the springs 17a and 17b are expanded and contracted accompanied by the pivotal movement. A torque variation of the crankshaft 9 due to the fluctuation of angular velocity is absorbed by expansion and contraction of the springs 17a and 17b. As a result, generation of resonance in a timing chain system (driving force transmission system 1) is suppressed.

Figure 9:
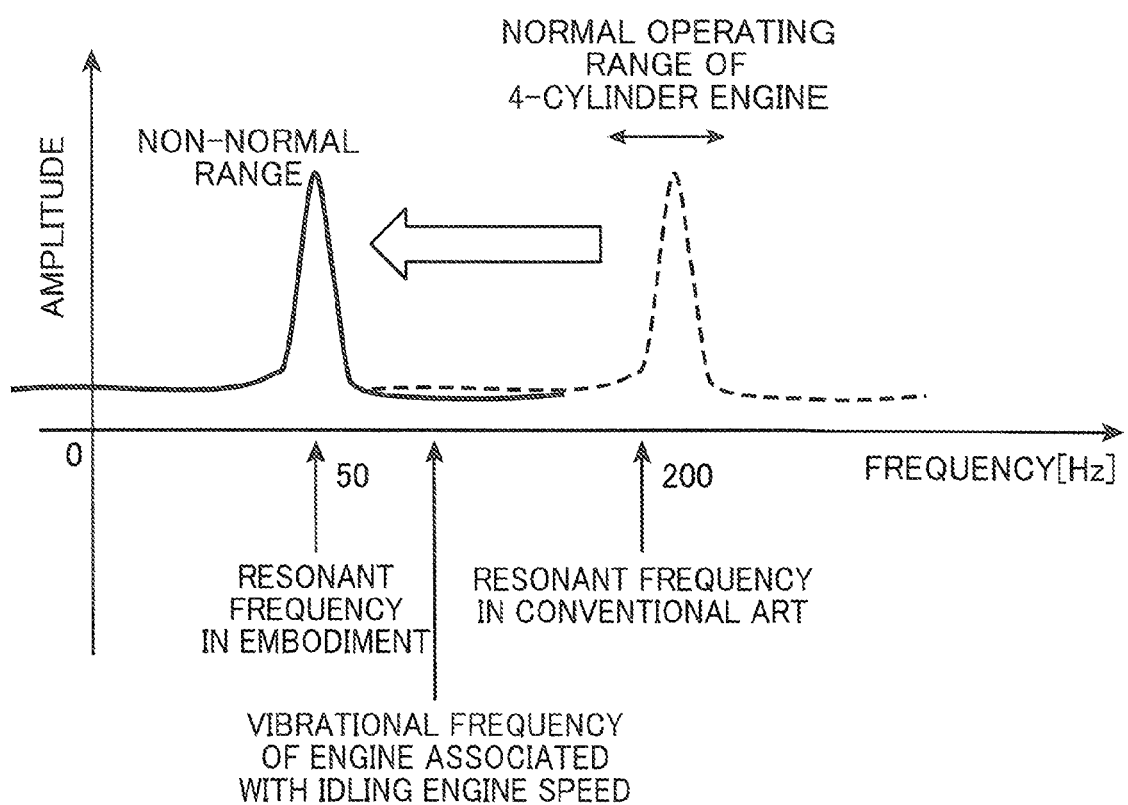
FIG. 9 is a diagram illustrating advantageous effects of the embodiment of the present invention.

An elastic modulus (spring constant) of the entirety of the springs 17a and 17b, namely, an elastic modulus of the damping portion 17 is set to such a value that a resonant frequency of the entirety of the driving force transmission system 1 is smaller than a vibrational frequency of the engine 30 associated with an idling speed of the engine 30 (see FIG. 9).

In the following, the aforementioned relationship is described in details. When the first timing chain 11 and the second timing chain 2 constituting the driving force transmission system 1 are observed in terms of springs, it is possible to regard the driving force transmission system 1 as a connected member of springs.

Specifically, the crank sprocket 10 and the first sprocket 12 are connected by the first timing chain 11 (spring). The first sprocket 12 and the second sprocket 15 are connected by the springs 17a and 17b. The second sprocket 15, the exhaust cam sprocket 3, and the intake cam sprocket 4 are connected by the second timing chain 2 (spring).

Figure 8:
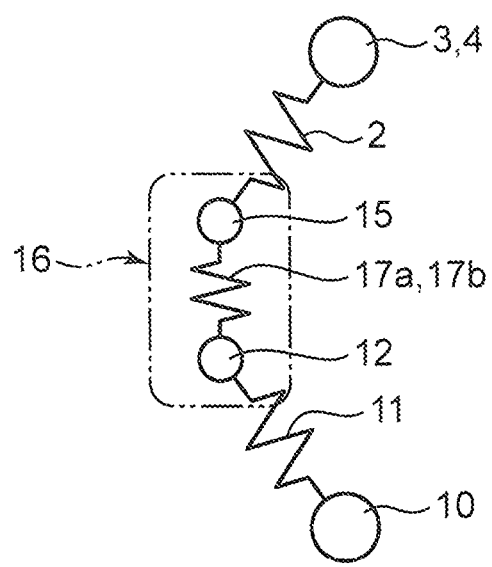
FIG. 8 is a schematic diagram illustrating the driving force transmission system for an engine in the embodiment of the present invention in terms of a spring system.

When the first timing chain 11 and the second timing chain 2 are connected to each other in series, and when it is assumed that k1 is an elastic modulus of the entirety of the first and second timing chains 11 and 2, k2 is an elastic modulus of the entirety of the springs 17a and 17b (elastic modulus of the damping portion 17), and m is a mass of the entirety of the connected member illustrated in FIG. 8, which is a combination of the first timing chain 11, the second timing chain 2, and the springs 17a and 17b, an elastic modulus k' of the entirety of the connected member is expressed by Eq. (1). Note that in the model illustrated in FIG. 10, the reference numeral 16A denotes a dual sprocket without springs 17a and 17b.

$$k' = \frac{1}{\frac{1}{k1} + \frac{1}{k2}} \qquad \text{Eq. (1)}$$

A resonant frequency f' of a spring having the elastic modulus k' is expressed by Eq. (2).

$$f' = \sqrt{\frac{\frac{1}{\frac{1}{k1} + \frac{1}{k2}}}{m}} \qquad \text{Eq. (2)}$$

Figure 10:
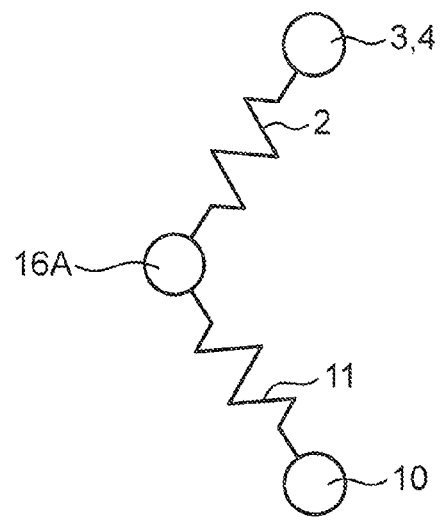
FIG. 10 is a schematic diagram illustrating a driving force transmission system in terms of a spring system when a spring is not provided in a dual sprocket.

On the other hand, a resonant frequency f of the connected member of springs (whose elastic modulus is k1) illustrated in FIG. 10 is expressed by Eq. (3).

$$f = \sqrt{\frac{k1}{m}} \qquad \text{Eq. (3)}$$

Eq. (2) includes the elastic modulus k2. Therefore, the resonant frequency f' of the model illustrated in FIG. 8 is smaller than the resonant frequency f of the model illustrated in FIG. 10 (f'<f). Accordingly, as illustrated in FIG. 9, in the embodiment, it is easy to set a resonant frequency of the entirety of the driving force transmission system 1 small.

As described above, in the embodiment, it is possible to adjust the elastic modulus of the entirety of the driving force transmission system 1 in such a manner that a resonant frequency of the entirety of the driving force transmission system 1 does not coincide with a vibrational frequency of an excitation force by providing the springs 17a and 17b for connecting the first sprocket 12 and the second sprocket 15. According to this configuration, it is possible to effectively suppress a phenomenon that the timing chains 2 and 11 are brought to a resonant state. This makes it possible to suppress shortening of the life of the timing chains 2 and 11.

Further, in the embodiment, an elastic modulus of the spring 17a (17b) is set to such a value that the resonant frequency f' of the entirety of the driving force transmission system 1 is smaller than the vibrational frequency of the engine 30 associated with an idling engine speed when the engine 30 is operated in a no load state. Therefore, the resonant frequency of the entirety of the driving force transmission system 1 is made smaller than the vibrational frequency associated with a normal operating range of the engine 30. This is advantageous in suppressing a phenomenon that the timing chain 2 (11) is brought to a resonant state.

Further, in the embodiment, the intermediate shaft 13 serves as a fuel pump drive shaft for driving a fuel pump. Therefore, the driving force of the intermediate shaft 13 is used only for driving the fuel pump. This makes it possible to drive the fuel pump without adversely affecting an operation of other auxiliary machines of the engine.

Further, in the embodiment, a VVT is mounted on each of the exhaust camshaft 5 and the intake camshaft 6. This makes it possible to finely control the rotational phase of each of the exhaust camshaft 5 and the intake camshaft 6.

Further, there is a method in which the weight of a timing chain system (driving force transmission system) is increased, and a method in which a composite value of a spring constant of the entirety of a timing chain system is decreased to make a resonant frequency (natural frequency) small so as to avoid a phenomenon that a timing chain is brought to a resonant state. In the embodiment, a composite value of a spring constant of a timing chain system is made small by adding a spring. This makes it possible to suppress shortening of the life of a timing chain without adversely affecting combustion performance, while suppressing an increase in mechanical resistance of an engine due to an increase in weight of a timing chain system.

Note that in the embodiment, the two springs 17a and 17b are disposed between the first sprocket 12 and the second sprocket 15. The number of springs may be changed, as necessary.

Further, in the embodiment, the springs 17a and 17b constituted by compression coil springs are used as an example of the damping portion 17. The purpose of using the damping portion is to make a composite value of a spring constant of a timing chain system small. Therefore, it is possible to use a plate spring, a rubber member, or the like, in place of a compression coil spring.

Further, in the embodiment, the crank sprocket 10 is rotated in a counterclockwise direction (see FIG. 1). Alternatively, the crank sprocket 10 may be rotated in a clockwise direction.

Summary of Embodiment

The following is a summary of the features and the advantageous effects of a driving force transmission system for an engine disclosed in the embodiment.

A driving force transmission system for an engine disclosed in the embodiment is a driving force transmission system for transmitting a driving force of a crankshaft constituting the engine to a camshaft by an endless transmission member. The driving force transmission system is provided with a crank sprocket mounted on the crankshaft; a cam sprocket mounted on the camshaft; an intermediate shaft disposed between the crankshaft and the camshaft; a dual sprocket mounted on the intermediate shaft, and including a first sprocket and a second sprocket facing each other in a state that the first sprocket and the second sprocket are rotatable relative to each other; a first endless transmission member wound around the crank sprocket and the first sprocket; and a second endless transmission member wound around the cam sprocket and the second sprocket. The dual sprocket includes a damping portion for connecting the first sprocket and the second sprocket. The damping portion is configured to exert a resilient force in a rotational direction of the first sprocket and the second sprocket.

The aforementioned endless transmission member includes a timing chain and a timing belt. Further, the damping portion includes various resilient members. Specifically, the resilient members include a spring (such as a compression coil spring and a plate spring), and a rubber member.

In the aforementioned driving force transmission system for an engine, the damping portion is disposed between the first sprocket and the second sprocket, and the damping portion is configured to exert a resilient force in rotational direction of the first sprocket and the second sprocket. According to the aforementioned configuration, it is possible to adjust an elastic modulus of the entirety of the driving force transmission system in such a manner that a resonant frequency of the entirety of the driving force transmission system does not coincide with a vibrational frequency of an excitation force. This is advantageous in suppressing a phenomenon that an endless transmission member is brought to a resonant state by an excitation force from an intake cam and from an exhaust cam, and in suppressing shortening of the life of the endless transmission member.

In the driving force transmission system for an engine, preferably, the damping portion may include a spring.

According to the aforementioned configuration, it is possible to adjust an elastic modulus of the entirety of the driving force transmission system with a relatively simplified configuration. This is advantageous in suppressing a phenomenon that an endless transmission member is brought to a resonant state.

In the driving force transmission system for an engine, preferably, an elastic modulus of the damping portion may be set to such a value that a resonant frequency of an entirety of the driving force transmission system is smaller than a vibrational frequency of the engine associated with an idling engine speed when the engine is operated in a no load state.

According to the aforementioned configuration, the resonant frequency of the entirety of the driving force transmission system is made smaller than the vibrational frequency associated with a normal operating range of the engine (a speed range of not smaller than an idling engine speed). This is advantageous in suppressing a phenomenon that an endless transmission member is brought to a resonant state.

In the driving force transmission system for an engine, preferably, the intermediate shaft may include a fuel pump drive shaft for coaxially driving a fuel pump.

According to the aforementioned configuration, a driving force of the intermediate shaft is used only for driving a fuel pump. This makes it possible to drive the fuel pump without adversely affecting an operation of the other auxiliary machines of the engine.

Preferably, the driving force transmission system for an engine may be further provided with a variable valve timing mechanism mounted on the camshaft.

According to the aforementioned configuration, it is possible to finely control the rotational phase of the camshaft without being affected by driving of a fuel pump.

This application is based on Japanese Patent Application No. 2015-149750 filed on Jul. 29, 2015, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A driving force transmission system for an engine, configured to transmit a driving force of a crankshaft constituting the engine to a camshaft by an endless transmission member, the driving force transmission system comprising:
   a crank sprocket mounted on the crankshaft;
   a cam sprocket mounted on the camshaft;
   an intermediate shaft disposed between the crankshaft and the camshaft;
   a dual sprocket mounted on the intermediate shaft, and including a first sprocket and a second sprocket facing each other in a state that the first sprocket and the second sprocket are rotatable relative to each other;
   a first endless transmission member wound around the crank sprocket and the first sprocket; and
   a second endless transmission member wound around the cam sprocket and the second sprocket, wherein
   the dual sprocket includes a damping portion for connecting the first sprocket and the second sprocket, the damping portion being configured to exert a resilient force in a rotational direction of the first sprocket and the second sprocket.

2. The driving force transmission system for an engine according to claim 1, wherein the damping portion includes a spring.

3. The driving force transmission system for an engine according to claim 2, wherein
   an elastic modulus of the damping portion is set to such a value that a resonant frequency of an entirety of the driving force transmission system is smaller than a vibrational frequency of the engine when the engine is operated at a predetermined engine speed.

4. The driving force transmission system for an engine according to claim 3, wherein
   the predetermined engine speed is an idling engine speed when the engine is operated in a no load state.

5. The driving force transmission system for an engine according to claim 1, wherein
   the intermediate shaft includes a fuel pump drive shaft for coaxially driving a fuel pump.

6. The driving force transmission system for an engine according to claim 1, further comprising:
   a variable valve timing mechanism mounted on the camshaft.

* * * * *